May 18, 1965 W. A. GURNEY ETAL 3,183,707
STIFFNESS-DETERMINING DEVICE
Filed Dec. 1, 1961 5 Sheets-Sheet 2

Inventors
William A. Gurney
Arthur J. Stubbs
By Stevens, Davis, Miller & Mosher
Attorneys May 18, 1965   W. A. GURNEY ETAL   3,183,707
STIFFNESS-DETERMINING DEVICE
Filed Dec. 1, 1961   5 Sheets-Sheet 3

Inventors
William A Gurney
Arthur J. Stubbs
By Stevens Davis Miller & Mosher
Attorneys

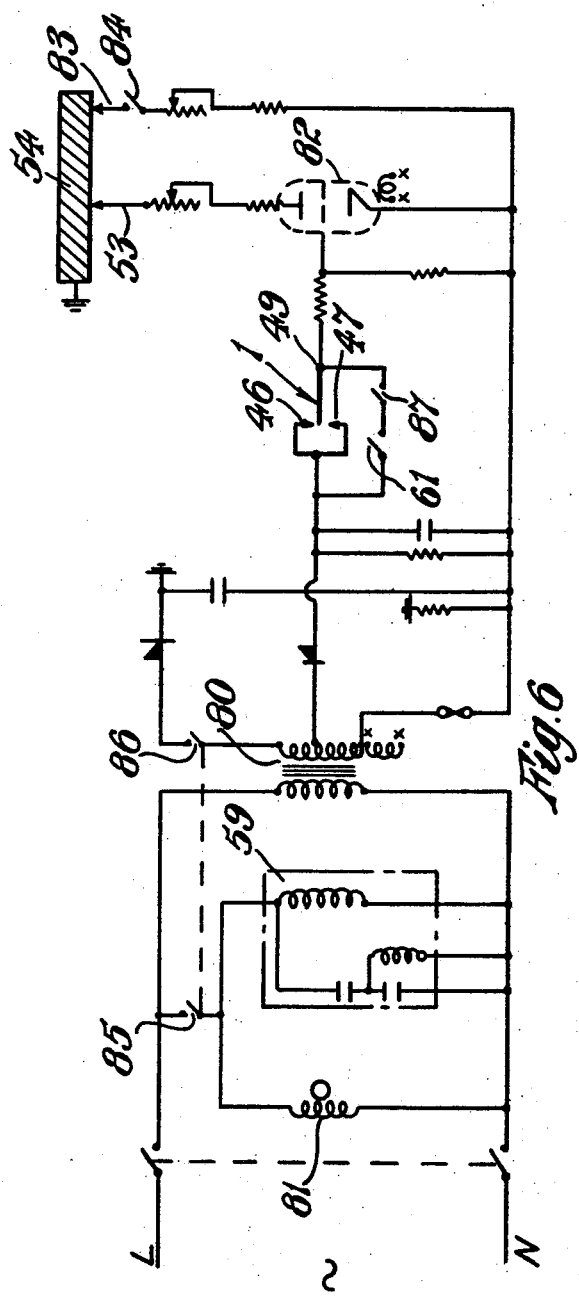

United States Patent Office 3,183,707
Patented May 18, 1965

3,183,707
STIFFNESS-DETERMINING DEVICE
William Arthur Gurney, Castle Bromwich, and Arthur James Stubbs, Solihull, England, assignors to Dunlop Rubber Company Limited, a British company
Filed Dec. 1, 1961, Ser. No. 156,384
Claims priority, application Great Britain, Dec. 20, 1960, 43,681/60
11 Claims. (Cl. 73—15.6)

This invention relates to a stiffness-determining device for testing yieldable materials, and especially for testing the state of cure of materials such as vulcanizable rubber compositions as they are heated to effect vulcanization.

According to the invention, a stiffness-determining or cure-testing device comprises a framework, an inextensible sandwich strip for embedding within a sample of material in respect of which the stiffness is to be determined or the cure is to be tested, a clamp fixed to the framework and located on each side of the strip for clamping the said sample, opposed springs connected one to each end of the strip, oscillation means connected to the strip, means for limiting the amplitude of movement of the strip, and means for recording the force applied to oscillate the strip between the limits of amplitude.

A device for determining the stiffness or testing the cure of a sample, constructed in accordance with the invention, enables small samples of the material to be tested and since the movement of the strip is only small when such samples are tested, then it is preferred to incorporate an amplifying means in the device to amplify the movement of the strip when recorded.

The device preferably includes a beam member pivotally mounted on a pivot on said framework and connected to said strip and adapted to oscillate through a predetermined amplitude. One end of the strip is also connected to a spring connecting said strip to said oscillation means. The other end of the strip can be connected to a second spring acting in opposition to the first-mentioned spring. In any case, at least one end of the strip must be connected to the beam member which forms the connection to the respective spring, and the two springs are mounted in opposition. For instance, the springs can be mounted on the beam member on the same side of the pivot but in opposite directions, or can be mounted one on each side of the pivot to act in the same direction on the beam member so that as the beam member pivots, the movement is restrained by one of the springs.

The means to limit the amplitude of movement of the strip can be a stop located to abut the strip when it moves to a predetermined position or can be located to abut the beam member. Preferably, a pair of stops are provided adjacent one end of the beam member to limit the amplitude of movement thereof and positioned at a greater distance from the pivot than the distance between the point of attachment of the strip to the beam member and the pivot.

The device, according to the invention, can include any type of recording means for recording the force applied to oscillate the strip and can be, for example, an electrical transducer or can conveniently comprise a recording device of the type described and claimed in our co-pending U.S. application Serial No. 156,216. Such a recording device consists essentially of an electrical recording circuit energised in response to movement of the strip or beam member to a predetermined position spaced from the resting position in the direction of oscillation of the strip of beam member, and recording means actuated by energization of the recording circuit so as to record the part of the period of oscillation which elapses before the strip reaches the predetermined position. The recording means which is of particular use in this invention, comprises an electrically-conductive support for electro-sensitive paper, an electrically-conductive stylus mounted for oscillation through a predetermined amplitude in response to said means, and means for moving the paper transversely of the direction of movement of the stylus, the support and stylus being connected in the electrical recording circuit. Generally, said stylus is mounted on the spring connected to the oscillation means, but it may be mounted on the other spring, if desired. Preferably, the electrical recording circuit is energised when the strip or beam member is moving between its limits of amplitude, and when the strip or beam member abuts the stop or pair of stops, an electrical circuit is closed so that the recording means is inoperative. As the strip or beam member moves between its limits of amplitude, then the stylus forms a trace on the electro-sensitive paper which indicates the force applied to the strip or beam member to oscillate it between its limits of amplitude.

The means for oscillating said strip or beam member can be any suitable known type, but preferably is mechanical means such as a crank or other eccentric connected to the first-mentioned spring.

A device constructed in accordance with the invention is particularly useful for testing the state of cure of a vulcanizable rubber composition or other curable composition in which a sample of the material to be tested is clamped between platens to heat said sample to effect vulcanization or curing thereof. The platens can be heated by any suitable means such as by steam and electrical heating elements. As the sample is heated, then the stiffness increases requiring an increased force to be applied to oscillate the beam member or strip, and the trace made by the stylus indicates the increased stiffness.

One form of stiffness-determining device constructed according to the invention for use in determining the state of cure of a sample of a vulcanizable composition, will now be described by way of example with reference to the accompanying drawings, in which:

FIGURE 6 is a circuit diagram for the recording means.

Figure 1:
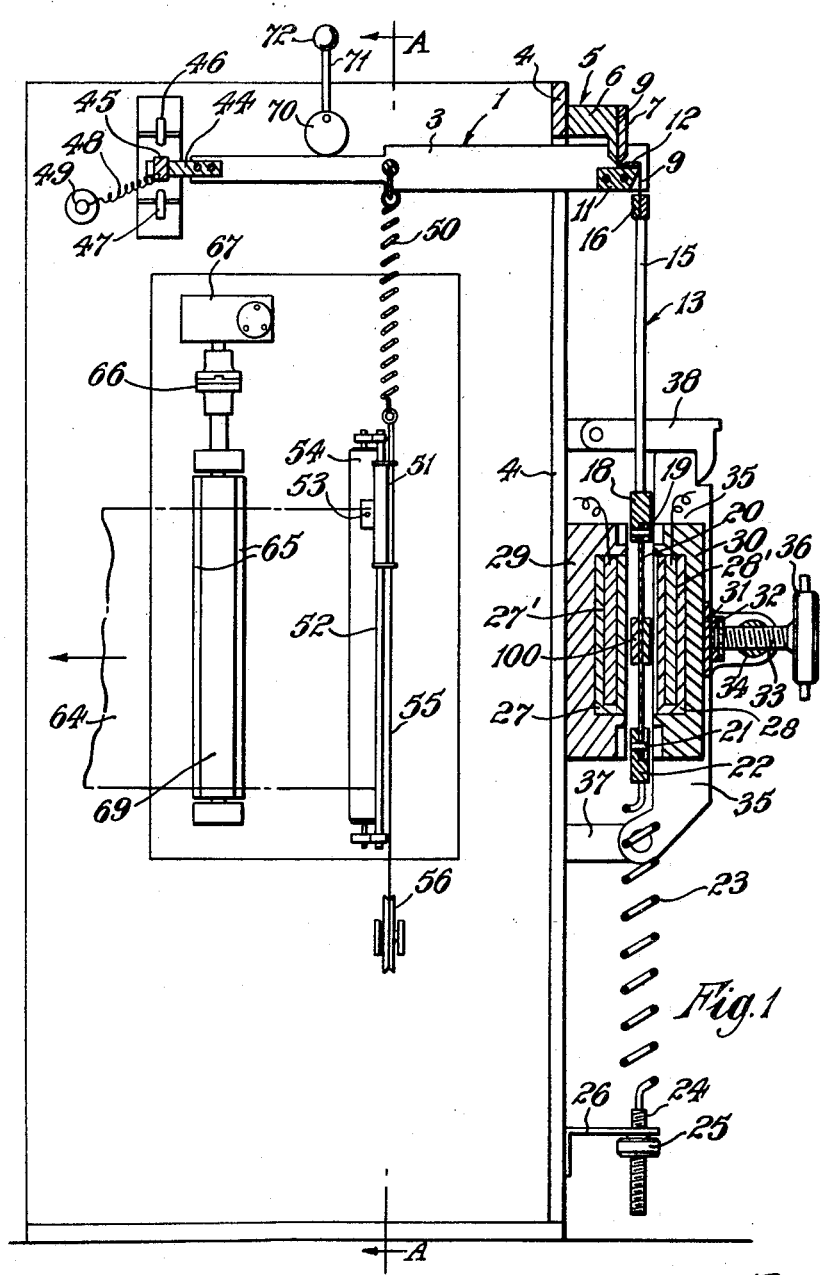
FIGURE 1 is a front elevation of the device, part of which is shown in section.
Figure 2:
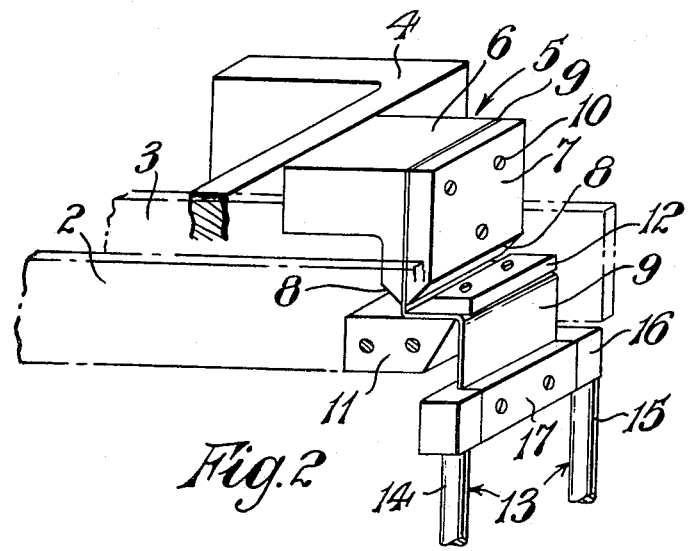
FIGURE 2 is a perspective view of one end of the beam member.

The device consists of a beam member 1 formed by two spaced limbs 2, 3 pivotally mounted on a framework 4 by a support member 5, FIGURE 1 shows the beam member 1 with the front limb 2 removed. The support member 5 consists of an L-shaped member 6 secured to the framework 4 and a facing plate 7, each chamfered as at 8 to be downwardly pointed. A Phosphor bronze strip 9 is retained between the L-shaped member 6 and the facing plate 7 by screws 10 and is secured a short distance below said support member 5 to the horizontal upper surface of a supporting block 11 fixed transverse of the beam member 1 adjacent its end. A chamfered plate 12 locates the Phosphor bronze strip 9 on the supporting block 11 and the Phophor bronze strip permits the beam member 1 to pivot about the supporting member 5. The Phosphor bronze strip 9 extends downwardly of the beam member 1 and is secured to a link member 13.

The link member 13 consists of two spaced parallel rods 14, 15, each connected at one end to a transverse member 16 in a slot of which is secured the end of the Phosphor bronze strip 9 by means of plate 17. The rods 14, 15 hang perpendicularly from the beam member 1, when in the resting position, and are connected at their other ends to a further transverse member 18 which is provided with a peg 19 engaging one end of a perforated inextensible strip 20 of Invar steel or other light non-extensible material. The other end of strip 20 is located on a peg 21 provided on a transverse member 22 connected to a coil spring 23. The other end of spring 23 is secured to a tension adjusting means consisting of a threaded rod 24 and a nut 25 which is retained by a frame member 26. The link member, strip and coil spring are shown in section. If desired, the transverse member 22 can be carried on a retaining lever pivoted to a frame member which is connected to said spring 23 to facilitate easy fitting of the strip 20 on pegs 19, 21.

Clamping means are provided on each side of the strip 20 and these are shown in section in FIGURE 1. The clamping means comprise a pair of platens 27, 28, one, 27, of which is secured to the framework 4. Each platen is provided with electrical heating means 27', 28' and surrounded on five faces with heat-insulating material 29, 30. The outer platen 28 is axially movable with respect to the other platen 27 and is carried on a plate 31 secured to a further plate 32 being captive means for the end of a threaded rod 33. This rod 33 engages a bar 34 of a pair of support members 35 and can be screwed axially inwardly or outwardly of the bar 34 by means of wheel 36 (shown in full) to move the platen 28 and insulating material 30 towards or away from the other platen 27. The support members 35 are pivotally secured on their lower ends to a frame member 37 to permit the platen 28 to be swung clear of the strip 20 to facilitate fitting thereof and when the support members 35 are in the closed position as indicated in FIGURE 1, they are retained by a latch 38.

Figure 3:
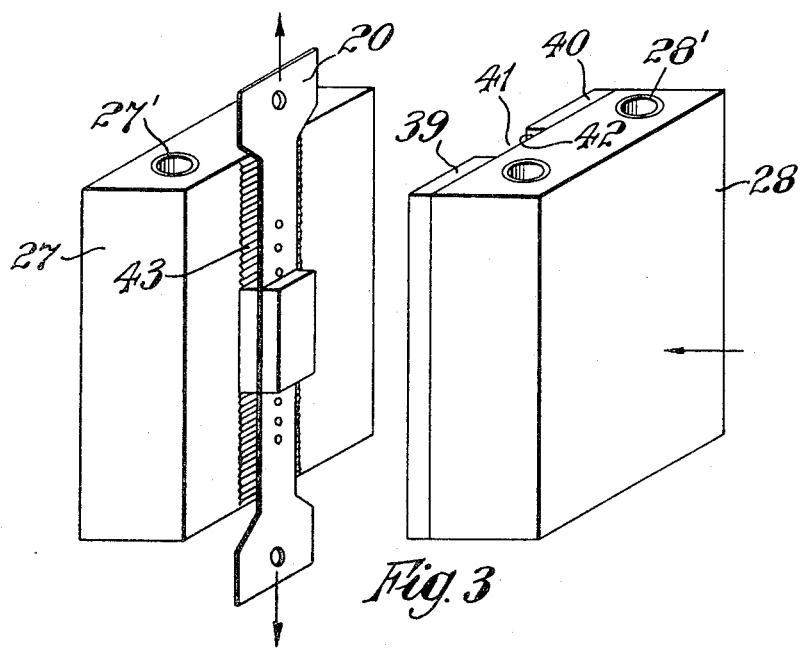
FIGURE 3 is a perspective view of the inextensible strip and clamping means.
Figure 4:
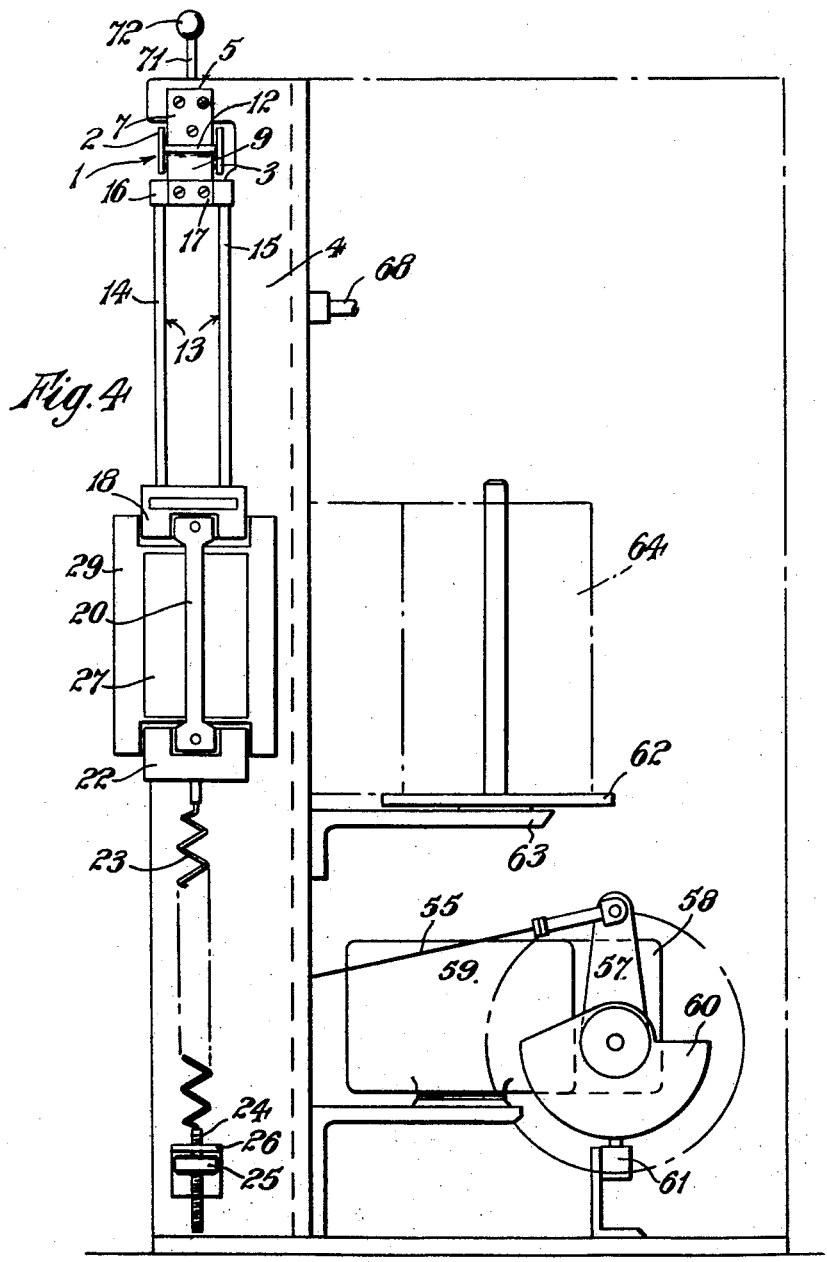
FIGURE 4 is an end-view of the device.
Figure 5:
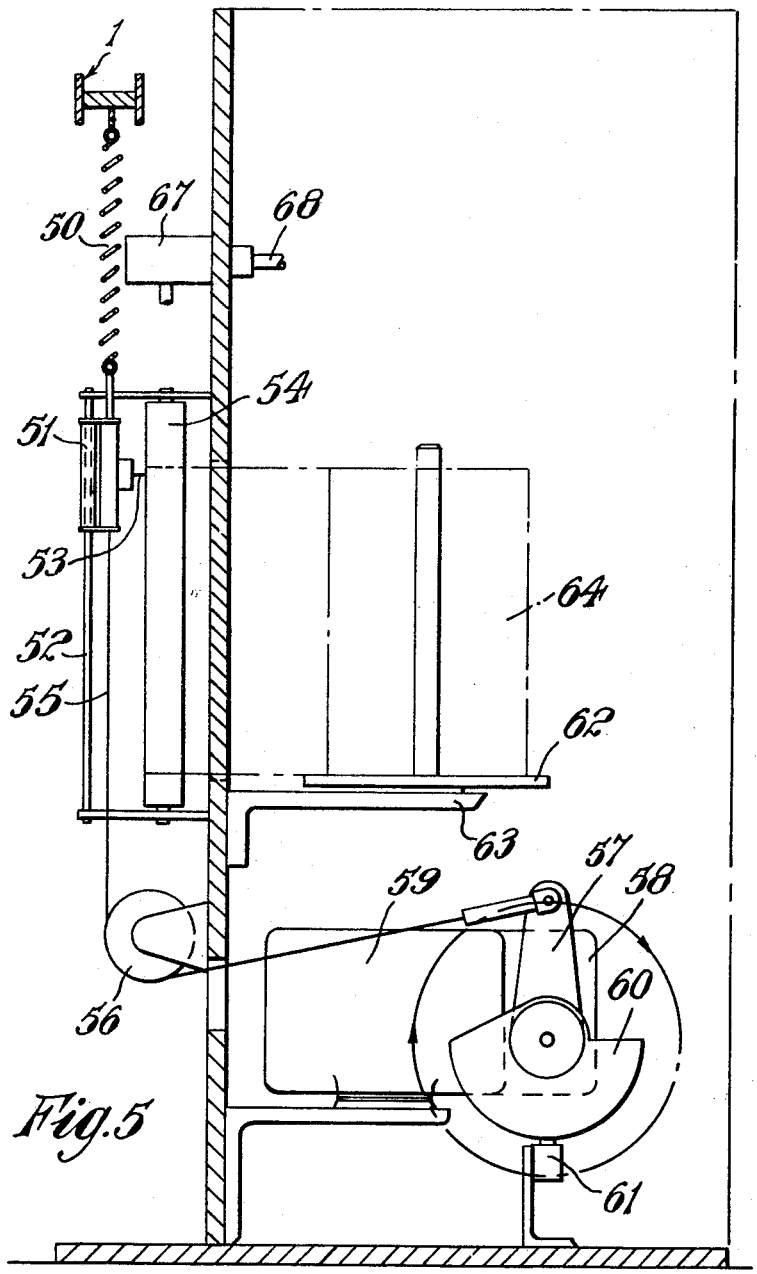
FIGURE 5 is a sectional elevation on the line A—A of FIGURE 1.

As shown in FIGURE 3 the outer platen 28 is provided on its inner face with two strips 39, 40 which define a slot 41 and the portion of the face of the platen 28 forming the base 42 of the slot 41 is provided with series of saw-tooth serrations. The inner face of the other platen 27 is provided with a series of serrations 43 corresponding in position to those of platen 27.

The beam member terminates, at the end opposite to the pivoted end, in a rod 44 of electrical insulation material which carries a short metal rod 45 positioned to contact a pair of stops 46, 47 of electrically-conductive material at the limits of amplitude of movement of the beam member 1. The stops 46, 47 are positioned at such a distance apart that the overall vertical movement of the strip 20 when the beam member pivots, is of the order of 10 thousandths of an inch. The short metal rod 45 is also connected by means of a piece of fine flexible wire 48 to a terminal 49, this wire 48 offering no substantial resistance to movement of the beam member 1.

A spring 50 is suspended from the beam member 1 at one end at a point approximately midway between the pivot and the stops 46, 47 and is secured at the other end to a carriage 51 slidable on a rod 52 secured to the framework 4. The carriage supports an electrically conductive stylus 53 insulated from said carriage so that the stylus traverses a roller 54 of electrically-conductive material. The other end of the carriage is secured by means of a cord 55 passing round a pulley 56 to a crank 57 on the shaft of a variable speed gear-box 58 driven by an electric motor 59. The crank 57 is secured to a cam 60 having a cam surface extending through 180 degrees. A cam switch 61 is mounted on the framework 4 to be operated by the cam surface as it rotates. The electric motor 59 will be referred to hereinafter as the "pen" motor.

A turntable 62 is mounted by means of support member 63 to said framework 4 and is adapted to carry a roll of electro-sensitive paper 64, the end of which passes through a vertical slot in the framework 4 over roller 54 and a further roller 65 driven through a coupling 66 and gear-box 67 by means of shaft 68 which is driven by means of a further electric motor (not shown) which will be referred to hereinafter as the "chart" motor and is schematically shown in FIGURE 6 as 81. The roller 65 as it rotates serves to draw the electro-sensitive paper 64 from the roller 65 at a constant speed. A pressure roller 69 is also secured to the framework to maintain the paper in contact with roller 65 and this pressure roller 69 is indicated as shown.

A locating cam 70 is rotatable on a shaft to locate the beam member 1 in a central resting position between the stops 46, 47 as shown in FIGURE 1. The locating cam 70 is provided with an arm 71 to which is secured a knob 72 to facilitate rotation of the locating cam 70. Rotation of the locating cam 70 is also arranged to close a pair of coupled microswitches to energise the pen motor 59 and the chart motor 81 and also the electrical recording circuit.

FIGURE 6 is a circuit diagram of the recording device and consists, as shown, of a transformer 80, the primary coil of which is supplied by the mains through a mains switch. The pen motor 59 and the chart motor 81 are connected in parallel to the mains. The transformer 80 is arranged so as to provide a high tension circuit for a triode valve 82, the anode of which is connected through a variable resistance to the electrically-conductive stylus 53 carried so as to transverse the electrically-conductive roller 54 which is connected to the framework of the device. The transformer 80 is tapped midway along its secondary coil to provide a voltage of −125 volts at the two stops 46, 47 which the beam member 1 abuts at its limits of amplitude. When the beam member 1 abuts either of the stops 46, 47, then a negative voltage is applied to the grid of the triode valve via the short metal rod 46 and terminal 49 to prevent currents flowing through the valve to ground via the roller 54. The half-wave rectifier is included in high tension circuit of the valve and a further half-wave rectifier is included in the circuit of the beam member 1 and each half-wave rectifier is provided with a smoothing condenser. The device is further provided with a stylus 83 controlled by a switch 84 to mark the electro-sensitive paper 64 periodically, and usually the paper is marked at minute intervals. The primary coil circuit and secondary coil circuit are each controlled by coupled switches 85, 86 which are operated by the locating cam 70 when moved from its mid-point.

When it is desired to use the device for testing the state of cure of a vulcanizable rubber composition, then a small sample 100 of the rubber composition is placed so as to form a sandwich with the strip 20 and clamped between the platens 27, 28. Usually, it is desirable to insert the sample after the platens have been heated to the vulcanization temperature. The locating cam 70 is moved from its mid position to close switches 85, 86 and to allow the beam member 1 to move freely. The pen motor and chart motor are both brought into operation and the crank 57 rotates about its shaft member to oscillate the carriage 51 on the rod 52. The spring 50 is thereby oscillated, causing the beam member 1 to oscillate between the stops 46, 47. At the same time, the electro-sensitive paper 64 is slowly moved over the roller 54 by means of rollers 65, 69. As the beam member oscillates, the strip 20 oscillates within the sample 100 and since this is clamped securely to the strip 20, the oscillations of the strip bring about deflection on the sample 100. When the beam member 1 is moving between the contacts 46, 47, there is no negative voltage applied to the grid of the triode valve and desired discharge through the valve is permitted so that the stylus 53 records a line vertically on the electro-sensitive paper 64. When the beam member 1 abuts either of the stops 46, 47 then a negative voltage is applied to the grid of the valve, preventing discharge through the valve so that no trace is recorded on the electro-sensitive paper. As the sample of rubber composition becomes vulcanized, the stiffness of the composition increases and the resistance to deflection also increases, requiring an increased force to oscillate the beam member 1 between the two contacts 46, 47. The force applied by spring 50 to move the beam member 1 from stops 46, 47 increases as vulcanization proceeds and this is recorded as a line of increasing length on the electro-sensitive paper 64.

The recording device records a series of lines corresponding to the respective upward and downward movement of the beam member 1. However, due to hysteresis of the sample of rubber composition, the lines of the respective series are relatively displaced, giving a shading effect on the record. If it is desired to record when the beam member is moving in only one of its directions, then the cam switch 61 is arranged to close when the beam member is moving in the other direction. For instance, should it not be desired to record upward movement of the beam member, then the cam switch 61 is arranged to close when the carriage 51 begins its upward movement from the bottom of the rod 52 so that even though the beam member is between the stops 46, 47 the negative voltage is still applied to the grid to prevent discharge through the electro-sensitive paper 64. The cam switch 61 can be coupled in series with a further switch 87 which is closed should it be desired to make use of the cam switch 61. The cam switch 61 and further switch 87 are both connected parallel with the stops 46, 47 and terminal 49. The lines recorded by the recording device lengthen to a maximum as the vulcanization is completed.

Since the stiffness-determining device provides a comparative record of the force absorbed by the yieldable material, the reproducibility of results obtained from a number of devices, according to the invention, is good, and thermal effects do not substantially alter the length of the lines recorded. The movement of the inextensible strip of the materials to be tested is very small with the result that inaccuracy due to tear, is obviated.

In an alternative form of an electrical circuit to energise the recording means, the beam member opens the electrical circuit when it contacts the stops to prevent the flow of electricity to the recording means. For instance, the beam member can be made to abut the respective stop at its limits of amplitude and also to open a switch comprising a pair of spring leaves which are connected to a transformer when the beam member is moving between the stops.

The coil spring 23 secured to one end of the strip can be replaced, if desired, by a suitably-positioned leaf spring.

Having now described our invention, what we claim is:

1. A stiffness-determining or cure-testing device comprising a framework, an inextensible sandwich strip adapted to be embedded within a sample of material of which the stiffness is to be determined or the cure is to tested, a clamp fixed to the framework and located on each side of the strip for clamping the said sample therein, a beam member pivotally mounted on a pivot on said framework and connected to one end of said strip, a stop means to limit the amplitude of movement of said beam member, oscillation means disposed contiguous said beam member, a first spring connected between said beam member and said oscillation means to impart oscillations to said beam member, a second spring connected to the other end of said strip to act in opposition to said first spring, and means operatively connected to said oscillation means for recording the force applied to oscillate the strip.

2. A device according to claim 1 in which means to adjust the tension in the second spring are provided between said framework and the end of the spring secured thereto.

3. A device according to claim 1 in which said stop means include two stops provided on said framework located one on each side of the beam member adjacent one end thereof.

4. A device according to claim 3 in which the distance between said stops and the pivot is greater than the distance between the point of attachment of the strip to the beam member and the pivot.

5. A device according to claim 1 in which said oscillation means comprise an eccentric.

6. A device according to claim 1 in which said means for recording the force applied to said strip comprises an electrical recording circuit energised in response to movement of said beam member to a predetermined position spaced from the resting position in the direction of oscillation of the beam member, and recording means actuated by energisation of the electrical recording circuit to record the part of the period of oscillation which elapses before the beam member reaches the predetermined position.

7. A device according to claim 6 in which the recording means comprises an electrically-conductive support for electro-sensitive paper, an electro-conductive stylus mounted for oscillation through a predetermined amplitude in response to a said means which oscillates the beam member, and means for moving the paper transversely of the direction of movement of the stylus, the support and the stylus connected in the electric recording circuit.

8. A device according to claim 6 in which said electrical recording circuit is energised when said beam member is free of said stop means.

9. A cure-testing device for testing the state of cure of a vulcanizable rubber composition comprising a framework, an inextensible sandwich strip adapted to be embedded within a sample of vulcanizable rubber composition, a pair of platens mounted on the framework and located one on each side of the strip for clamping the said sample therebetween, heating means to heat said platens, a beam member pivotally mounted on a pivot on said framework and pivotally secured at one end to one end of said strip, a spring connected between the other end of said strip and said framework, oscillation means disposed contiguous said beam member, a further spring connected between said beam member and said oscillation means to impart oscillations to said beam member, a pair of stops located on said framework and positioned one on each side of and at the end of said beam member opposite to that secured to said strip to limit the amplitude of movement of said beam member, and means operatively connected to said oscillation means to record the force applied to oscillate said beam member.

10. A cure-testing device according to claim 9 in which said heating means are electrical heating elements to effect the heating of said platens.

11. A device for following the vulcanization of a sample of a rubber composition as it is vulcanized which comprises a framework, a beam member, a pivot provided on said framework on which the beam member is pivotally mounted adjacent one end, a first spring connected to said beam member intermediate its other end and the pivot, means to alternately elongate and relax said spring to oscillate said beam member, stop means to limit the amplitude of movement of the beam member, a substantially inextensible strip pivotally connected at one end to the end of the beam member adjacent the pivot, a clamp secured to said framework and located on each side of the strip for clamping a sample of rubber composition in contact with both sides of the strip, means to heat the rubber composition to effect vulcanization thereof, a second spring connected at one end to the other end of the strip and secured at its other end to the framework so as to act in opposition to the first spring, an electrically-conductive support for electro-sensitive paper, an electro-conductive stylus mounted on a carriage secured for movement with said first spring to traverse said paper, and an electrical circuit incorporating said stop means and said stylus energized when said beam member is not in contact with said stop means to record a line on said paper whereby a line of increasing length up to a maximum is obtained when said rubber composition is heated to effect vulcanization.

(References on following page)

References Cited by the Examiner

UNITED STATES PATENTS

| | | | |
|---|---|---|---|
| 1,156,726 | 10/15 | Upton et al. | 73—100 X |
| 1,163,830 | 12/15 | Kommers | 73—100 X |
| 1,991,854 | 2/35 | Johansson | 73—150 X |
| 2,713,260 | 7/55 | Prettyman et al. | 73—101 |
| 2,733,596 | 2/56 | Painter | 73—67.1 |
| 3,014,363 | 12/61 | Labout | 73—67.1 X |
| 3,030,803 | 4/62 | Painter | 73—67.1 |
| 3,039,297 | 6/62 | Peter et al. | 73—67.1 X |

RICHARD C. QUEISSER, *Primary Examiner.*
ROBERT L. EVANS, *Examiner.*